Patented Oct. 28, 1947

2,429,861

UNITED STATES PATENT OFFICE 2,429,861

COATING COMPOSITIONS OF POLYETHYLENE AND PROCESS FOR APPLYING SAME

Richard G. Woodbridge, III, Niagara Falls, N. Y., assignor to E. I. du Pont de Nemours & Company, Wilmington, Del., a corporation of Delaware No Drawing. Application April 3, 1945, Serial No. 586,455

4 Claims. (Cl. 260—32)

This invention relates to coating compositions comprising a solid ethylene polymer dissolved in a volatile solvent, and the process of applying such compositions to the surfaces of objects, and heating the same to remove the solvent therefrom.

Prior to this invention, coating compositions comprising a solid ethylene polymer in a volatile solvent were unsatisfactory for use in coating many objects because of a relatively large volume contraction of the coatings in passing from the liquid to the solid state. As a result of this objectionable volume contraction, the coatings are stretched tightly across points and corners of the coated objects, the coatings being undesirably thin at these points or even being caused to split, crack or peel. When coatings were formed in indentations, hollows or interior angles of an object, the volume contraction caused the coating to withdraw from such sections, leaving pockets.

In general, the most desirable solvents for polyethylene polymers, from a standpoint of ease of solution, low viscosity, high solubility and suitable volatility, are unsaturated hydrocarbon and unsaturated chlorinated hydrocarbon solvents, for example, benzene, toluene, xylene, trichlorethylene and tetrachlorethylene. Such unsaturated solvents are, however, unsatisfactory for the preparation of coating solutions for use in hot-dip coating of objects due to the large volume contraction of the coatings in passing from the liquid to the solid state.

Although saturated hydrocarbon solvents, for example, decahydronaphthalene, petroleum ether have also been suggested for use as solvents for polyethylene they have not been extensively used, and furthermore they are also unsatisfactory as solvents for the production of polyethylene solutions to be used in hot-dip coating. Such saturated hydrocarbons as would dissolve the polyethylene either produced solutions containing less than the desired proportion of polyethylene, or solutions having an undesirably high viscosity. Furthermore, due to the relatively high boiling points of such saturated hydrocarbons, in order to remove the same from the coating, it was necessary to heat the coatings to such high temperature that the coatings flowed badly, produced undesirably thin coatings and often caused a decided decomposition of the polyethylene.

It is an object of this invention to provide new and improved ethylene polymer coating compositions which have a greatly reduced volume contraction upon solidification.

It is another object of this invention to provide ethylene polymer coating compositions which will produce uniform and relatively thick coatings when applied by a hot-dip process and which will not be subject to objectionable volume contraction.

It is another object of this invention to provide a method for coating an object with a composition comprising an ethylene polymer dissolved in a volatile solvent, and solidifying the coating by removal of the solvent without objectionable volume contraction during the coating solidification.

Other objects of the invention will appear hereinafter.

The objects of the invention are accomplished, in general, by dissolving a solid ethylene polymer in a solvent comprising an unsaturated hydrocarbon solvent or unsaturated chlorinated hydrocarbon solvent and between 15% and 60%, based on the weight of the solvent, of a saturated hydrocarbon having a boiling point between 110° C. and 400° C., said solvent together with the saturated hydrocarbon having sufficient solvent power to dissolve at least 15% by weight of polyethylene and having a boiling point at least as high as but not to exceed 25° C. higher than the melting point of the polyethylene.

The ethylene polymers contemplated for use in accordance with the present invention are the solid polymers having a melting point above 110° C., and particularly those polyethylene polymers having a melting point between 110° C. and 165° C.

The unsaturated hydrocarbon and unsaturated chlorinated hydrocarbon solvents for use in accordance with the present invention are well known in the art and include benzene, toluene, xylene, ethylene chloride, chlorbenzene, trichlorethylene and tetrachlorethylene. The particular solvent chosen for any particular polyethylene should be capable of dissolving at least 15%, and preferably at least 20%, of the polymer.

The saturated hydrocarbon added to the unsaturated solvent functions as a coating-contraction reducing or preventing agent. The saturated hydrocarbon may or may not be a solvent for the polyethylene. A saturated hydrocarbon which will dissolve, or aid in dissolving, the polyethylene is preferred, but only for the reason that a greater amount of polyethylene can thereby be brought into solution. The contraction-preventing function or capacity of the saturated hydrocarbon appears to have no connection with the ability of the said hydrocarbon to dissolve the polyethylene. Any saturated hydrocarbon having a boiling point between 110° C. and 400° C. has a capacity for reducing the contraction of polyethylene coatings applied from a solution in an unsaturated hydrocarbon solvent, and is, therefore, useful in accordance with the present invention.

As examples of saturated hydrocarbons for use in the preparation of suitable hot-dip coating solutions in accordance with the present invention, the following may be mentioned: petroleum hydrocarbons refined to freedom from unsaturated hydrocarbons and having a boiling point between 110° C. and 400° C. including ligroin (boiling range 120°–135° C.), solvent naphtha (boiling range 130°–150° C.), gasoline (110° C.–220° C.), petroleum naphtha (boiling range 150° C.–200° C.), liquid petrolatum (boiling range 360° C.–370° C.), kerosene (boiling range 204° C.–315° C.), paraffin (boiling range up to 400° C.); decahydronaphthalene, cyclohexane, decane, dodecane, tridecane and octadecane, or mixtures of them.

The particular manner in which the saturated hydrocarbon functions to reduce, or even substantially prevent, the volume contraction of the polyethylene coating applied from an unsaturated hydrocarbon, or unsaturated chlorinated hydrocarbon solvent is not understood, since it appears to be immaterial whether the saturated hydrocarbon addition agent remains in the coating or whether it is entirely volatilized therefrom. The action of the saturated hydrocarbon to prevent coating contraction of the above-mentioned solutions is, however, particularly noticeable when applied to polyethylene solutions in unsaturated chlorinated hydrocarbons and the latter are a preferred species.

The saturated hydrocarbon addition agent added to the solution comprising polyethylene and unsaturated solvent will change the boiling point of the solvent phase, usually raising the boiling point of the solvent phase. The quantity of saturated hydrocarbon addition agent added to the solvent will depend somewhat upon the melting point of the polyethylene to be dissolved. In order to obtain a suitable reduction of contraction of the resultant coating at least 15% by weight of the saturated solvent should be present in the solvent phase of the coating composition. In heating or baking a freshly coated object it should be heated above the melting point of the polyethylene used in the coating. By thus fusing the polyethylene, as the solvent is removed therefrom, a homogeneous and tough coating is obtained. On the other hand, the heating or baking must not be carried out at a temperature more than 25° C. above the melting point of the polyethylene to prevent excessive flowing of the polyethylene. In order to obtain the best results, therefore, the solvent phase of the solution should have a boiling point between the melting point of the polyethylene and a point 25° C. above the melting point of the polyethylene.

The coating solutions may be prepared by stirring the components together while heating the same. Preferably, the polyethylene is dissolved in the unsaturated solvent and the saturated hydrocarbon added thereto; however, if desired, the saturated hydrocarbon may first be dissolved or mixed with the solvent and the polyethylene dissolved in the mixture. The boiling point of the solvent phase of the solution must be above 110° C. (the lowest melting point temperature of a suitable polyethylene). These solutions when hot will be transparent somewhat viscous liquid which solidify or gel upon cooling.

The hot-dip coating of objects with the polyethylene coating compositions of the present invention is preferably carried out at a temperature above 90° C. so that the coating composition will not be too viscous and will satisfactorily run from the object. The solvent and at least a portion of the saturated hydrocarbon addition agent must then be removed from the object by baking. The solvent phase of the solution therefore must not be too volatile at the dipping temperature and yet it should be sufficiently volatile to be removed within a reasonable time during the baking procedure. As a general rule, the solvent phase of the solution should have such a volatility that after 30 to 60 minutes baking time the coating, when cooled to room temperature (about 70° F.) is clear, solid, substantially non-tacky and homogeneous.

A satisfactory coating and baking procedure for use with the above-described compositions may comprise the following steps.

(1) Maintain the polyethylene solution containing the unsaturated solvent and saturated hydrocarbon addition agent, free from bubbles, at a temperature between 90° C. and 110° C.

(2) Prepare the object to be coated, for example, a metal machine part, by cleaning, degreasing etc., if necessary.

(3) Dip the object into the solution and allow to drain.

(4) Bake the now coated object in an oven at a temperature above the melting point of the polyethylene contained in the solution but not in excess of 25° C. above the melting point of the polyethylene for a period of ½ hour or longer until sufficient solvent is removed to set up the coating in a tough film.

When large objects are coated, it may be desirable to preheat the object before dipping and then dip the object while hot, and removing the same to the baking oven before solidification of the coating. A number of successive coatings may be built up on an object by repeating the dipping and baking steps.

Under some circumstances, it is desirable to dip the object to be coated in a coating solution of polyethylene dissolved in a high boiling component, then exchange the high boiling component for a low-boiling component in a second dipping step, and still bake the coating at a moderate temperature not to exceed 25° C. above the melting point of the polyethylene in the coating. Coats from solutions of polyethylene in kerosene refined to freedom from odor and unsaturated hydrocarbons have been prepared in the following manner:

(1) A coating solution is first prepared by dissolving 30% by weight of polyethylene having a melting point of about 115° C., in kerosene having a boiling point of about 250° C. and refined to freedom from odor.

(2) The object to be coated is preheated to a temperature of 100° C. and is dipped into a concentrated, i. e., 30% solution of polyethylene in kerosene which is maintained at a temperature of 150° C.

(3) The dipped object is then cooled to room temperature.

(4) The coated object is then dipped in a cold mixture of 75% perchlorethylene-25% kerosene refined to freedom from odor. It is allowed to remain in contact with this second solution for one hour or longer.

(5) The object is then removed and baked in an oven at about 115° C.–120° C. for one hour.

Using the above-mentioned, refined kerosene alone as a solvent instead of a mixture containing perchlorethylene, permits the use of much higher dipping solution temperatures, and accordingly much more concentrated solutions. However, because of the high boiling point of kerosene alone, this solvent cannot be baked out of the coats without the use of such high temperatures that the coat will "flow" badly and decompose. Accordingly, this high boiling solvent is replaced by a mixture of solvents, which has a low boiling point, by immersing the cooled coated object in a cold mixture of 25% refined kerosene - 75% perchlorethylene.

The retention by the polyethylene of various amounts of the saturated hydrocarbon addition agents is sometimes desirable as these addition agents may impart desirable characteristics to the final coating. For example, films prepared from polyethylene dissolved in 75% perchlorethylene containing 25% refined kerosene, will retain some of the kerosene when baked for one hour at 115°–120° C. These films are very desirable since they may be easily cold-drawn, are flexible and strong, have a high gloss and a pleasing physical texture, and are highly resistant to ordinary chemical attack.

My invention may be used wherever it is necessary or desirable to prevent or reduce the effects of contraction exhibited by polyethylene in solutions as it changes to the solid state. It may be used in the application of polyethylene coats to objects, and for the preparation of films and filaments from solutions of polyethylene where contraction effects are undesirable. It may also be used for the preparation of larger objects of polyethylene such as sheets, bands, blocks, etc., from polyethylene solutions where contraction is a problem.

The advantage of my invention is that it permits the use of a wide variety of polyethylene solutions heretofore impossible to use or whose use was attendant by arduous labor and by narrow working limits, and the application of polyethylene coats from polyethylene solutions to objects heretofore impossible to coat. Attempts to coat irregular objects, such as electroplating racks from solutions of polyethylene in one of the pure standard solvents such as toluene, xylene, trichlorethylene and tetrachlorethylene is for all practical purposes impossible as the resultant coatings are full of holes, pockets, bubbles, thin places, pits, etc., etc. However, using an addition agent such as revealed above, excellent, clear coats may be obtained, that are homogenous, free from imperfections and also highly resistant to chemical attack.

Throughout the specification and claims, reference to percentages and proportions refer to percentages and proportions by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A liquid solution of polyethylene suitable for the hot-dip coating of objects which comprises at least 15% by weight of polyethylene having a melting point between 110° C. and 165° C. dissolved in a polyethylene solvent taken from the class consisting of unsaturated hydrocarbon solvents and unsaturated chlorinated hydrocarbon solvents and containing between 15% and 60% by weight of a saturated hydrocarbon having a boiling point between 110° C. and 400° C., the solvent phase of said solution having a boiling point between the melting point temperature of the polyethylene and a temperature 25° C. higher than the melting point temperature of the polyethylene.

2. A liquid solution of polyethylene suitable for the hot-dip coating of objects which comprises at least 15% by weight of polyethylene having a melting point between 110° C. and 165° C. dissolved in an unsaturated chlorinated hydrocarbon solvent and containing between 15% and 60% by weight of a saturated hydrocarbon having a boiling point between 110° C. and 400° C., the solvent phase of said solution having a boiling point between the melting point temperature of the polyethylene and a temperature 25° C. higher than the melting point temperature of the polyethylene.

3. A liquid solution of polyethylene suitable for the hot-dip coating of objects which comprises at least 15% by weight of polyethylene having a melting point between 110° C. and 165° C. dissolved in tetrachlorethylene and containing between 15% and 60% by weight of a saturated hydrocarbon having a boiling point between 110° C. and 400° C., the solvent phase of said solution having a boiling point between the melting point temperature of the polyethylene and a temperature 25° C. higher than the melting point temperature of the polyethylene.

4. A liquid solution of polyethylene suitable for the hot-dip coating of objects which comprises at least 15% by weight of polyethylene having a melting point between 110° C. and 165° C. dissolved in tetrachlorethylene and containing between 15% and 60% by weight of a petroleum hydrocarbon having a boiling range of between 204° C. and 315° C. and refined to substantial freedom of unsaturated hydrocarbons.

RICHARD G. WOODBRIDGE, III.

REFERENCES CITED

The following references are of record in the file of this patent:

UNITED STATES PATENTS

| Number | Name | Date |
|---|---|---|
| 2,334,195 | Hopff et al. | Nov. 16, 1943 |
| 2,384,848 | Peters | Sept. 18, 1945 |